UNITED STATES PATENT OFFICE.

MARCELLO VON PIRANI, OF WILMERSDORF, NEAR BERLIN, GERMANY, ASSIGNOR TO SIEMENS & HALSKE AKTIENGESELLSCHAFT, OF BERLIN, GERMANY.

PROCESS FOR PRODUCING TECHNICALLY-PURE DUCTILE TANTALUM.

No. 866,385.

Specification of Letters Patent.

Patented Sept. 17, 1907.

Application filed June 23, 1906. Serial No. 323,133.

*To all whom it may concern:*

Be it known that I, MARCELLO VON PIRANI, chemist, a subject of the King of Italy, residing at Wilmersdorf, near Berlin, Germany, have invented a certain new and useful Improvement in a Process for Producing Technically-Pure Ductile Tantalum, of which the following is a full, clear, concise, and exact description.

The present invention relates to a process for producing technically pure ductile tantalum, the process being distinguished by the simplicity with which it can be carried out and the certainty of the result and the good quality of the product.

The process consists in heating to a white heat, preferably beyond its melting point tantalum hydrid or hydrogenated tantalum. Said materials must be heated in a vacuum as otherwise the tantalum would take up foreign constituents out of the surrounding atmosphere. During the operation of heating it is preferable to take care that the vacuum is not reduced by the dissociated gases, all substances dissociated being immediately drawn off by means of an air pump.

Since hydrogenated tantalum or tantalum hydrid is a good conductor of electric current, the heating may be accomplished by passing an electric current through it. The substance melts readily in the electric arc. I do not wish to limit my invention to this specific method of heating the metal, as other equivalent methods may be employed within the scope of my invention.

Hydrogenated tantalum can be readily obtained by heating a mixture of vapors of tantalum chlorid with hydrogen. Even at a comparatively low temperature a substance resembling a metal is formed from this mixture said substance being extraordinarily brittle. It consists of tantalum and hydrogen, it being open to doubt whether it is a chemical compound or an alloy or a product of occlusion or absorption. If this substance is strongly heated it gives off a part of its hydrogen and on cooling takes up hydrogen anew if it remains in contact with hydrogen. The hydrogen is not completely dissociated until the substance has been heated beyond its melting point. There then results a metallic product of great ductility.

In producing tantalum hydrid or hydrogenated tantalum from tantalum chlorid and hydrogen the following method may be adopted with advantage, namely, the mixture of vapors of tantalum chlorid with hydrogen is conducted into a vessel in which a ribbon or filament of tantalum is freely extended or suspended, said ribbon or filament being heated to incandescence by an electric current. The brittle tantalum hydrid or the hydrogenated tantalum is then formed on the glowing tantalum ribbon or filament in the form of scales which can be readily removed from the tantalum ribbon or filament.

Since it has been open to doubt, as above stated, whether tantalum hydrid or hydrogenated tantalum is formed, I shall refer to the substance in the claims as hydrogenated tantalum, it being distinctly understood that tantalum hydrid is equivalent and as such is covered thereby.

What I claim as my invention and desire to secure by Letters Patent, is:

1. The process for producing technically pure tantalum in ductile form, which consists in heating a mixture of vapors of tantalum chlorid and hydrogen, and in heating the hydrogenated tantalum thus formed to a white heat in a vacuum.

2. The process for producing technically pure tantalum in ductile form, which consists in heating a mixture of vapors of tantalum chlorid and hydrogen, heating the hydrogenated tantalum thus formed to a white heat in a vacuum and exhausting the gases liberated thereby during said heating.

3. The process for producing technically pure tantalum in ductile form, which consists in heating tantalum to incandescence by an electric current in the presence of a mixture of vapors of tantalum chlorid and hydrogen, whereby hydrogenated tantalum is produced, and subsequently melting the tantalum thus produced in a vacuum.

4. The process for producing technically pure tantalum in ductile form, which consists in heating tantalum to incandescence by an electric current in the presence of a mixture of vapors of tantalum chlorid and hydrogen, whereby hydrogenated tantalum is formed and subsequently melting the hydrogenated tantalum thus formed in a vacuum and exhausting the gases liberated thereby during said melting.

In witness whereof, I hereunto subscribe my name this 31st day of May A. D., 1906.

MARCELLO VON PIRANI.

Witnesses:
   HENRY HASPER,
   WOLDEMAR HAUPT.